United States Patent
Aboketaf et al.

(10) Patent No.: US 11,353,651 B2
(45) Date of Patent: Jun. 7, 2022

(54) MULTI-MODE OPTICAL WAVEGUIDE STRUCTURES WITH ISOLATED ABSORBERS

(71) Applicant: GLOBALFOUNDRIES U.S. Inc., Santa Clara, CA (US)

(72) Inventors: Abdelsalam A. Aboketaf, Essex Junction, VT (US); Won Suk Lee, Malta, NY (US); Yusheng Bian, Ballston Lake, NY (US)

(73) Assignee: GLOBALFOUNDRIES U.S. INC., Malta, NY (US)

( * ) Notice: Subject to any disclaimer, the term of this patent is extended or adjusted under 35 U.S.C. 154(b) by 0 days.

(21) Appl. No.: 17/087,182

(22) Filed: Nov. 2, 2020

(65) Prior Publication Data
US 2022/0137290 A1    May 5, 2022

(51) Int. Cl.
| | | |
|---|---|---|
| *G02B 6/24* | (2006.01) | |
| *G02B 6/028* | (2006.01) | |
| *G02B 6/122* | (2006.01) | |
| *G02B 6/12* | (2006.01) | |

(52) U.S. Cl.
CPC ......... *G02B 6/0288* (2013.01); *G02B 6/1228* (2013.01); *G02B 6/243* (2013.01); *G02B 2006/1209* (2013.01); *G02B 2006/12126* (2013.01); *G02B 2006/12157* (2013.01); *G02B 2006/12195* (2013.01)

(58) Field of Classification Search
CPC ....................... G02B 6/243; G02B 2006/12126
See application file for complete search history.

(56) References Cited

U.S. PATENT DOCUMENTS

| | | | |
|---|---|---|---|
| 2,557,110 A | 6/1951 | Jaynes | |
| 2,619,538 A | 11/1952 | Grant | |
| 3,787,871 A | 1/1974 | Reese | |
| 4,799,031 A | 1/1989 | Lang et al. | |
| 6,897,498 B2 * | 5/2005 | Gothoskar | B82Y 20/00 257/226 |
| 7,002,429 B2 | 2/2006 | Asao et al. | |
| 2010/0296775 A1 | 11/2010 | Png | |
| 2014/0124669 A1 * | 5/2014 | Zheng | G02B 6/12004 250/340 |
| 2015/0147023 A1 | 5/2015 | Yamamoto | |
| 2017/0317471 A1 | 11/2017 | Lor et al. | |

(Continued)

FOREIGN PATENT DOCUMENTS

| | | | |
|---|---|---|---|
| CA | 3059510 A1 * | 10/2018 | ........... G02B 6/1228 |
| WO | WO-2005057253 A2 * | 6/2005 | ........... G02B 6/1228 |

OTHER PUBLICATIONS

Ken Giewont et al.,"300-mm Monolithic Silicon Photonics Foundry Technology", IEEE Journal of Selected Topics in Quantum Electronics, vol. 25, No. 5, Sep./Oct. 2019, 11 pages.

(Continued)

*Primary Examiner* — Charlie Y Peng
(74) *Attorney, Agent, or Firm* — Francois Pagette; Andrew M. Calderon; Roberts Calderon Safran & Cole, P.C.

(57) ABSTRACT

The present disclosure relates to semiconductor structures and, more particularly, to multi-mode optical waveguide structures with isolated absorbers and methods of manufacture. The structure includes: a waveguide structure including tapered segments; and at least one isolated waveguide absorber adjacent to the waveguide structure along its length.

20 Claims, 6 Drawing Sheets

(56) References Cited

U.S. PATENT DOCUMENTS

2019/0219782 A1* 7/2019 Liow ................. G02B 6/43
2021/0199887 A1* 7/2021 Bian .................. G02B 6/126

OTHER PUBLICATIONS

Yusheng Bian et al.,"Hybrid vanadate waveguiding configurations for extreme optical confinement and efficient polarization management in the near-infrared", The Royal Society of Chemistry 2018, Nanoscale, 2018, 10 pages, 16667-16674.

Michal Rakowski et al.,"45nm CMOS—Silicon Photonics Monolithic Technology (45CLO) for next-generation, low power and high speed optical interconnects", OFC 2020 © OSA, 3 pages.

Dae Ho Jung.,"Structural and electrical properties of transparent conductor SrVO3 thin films grown using radio frequency sputtering deposition", Journal of Vacuum Science & Technology, published Mar. 2019, 10 pages.

Lei Zhang et al., "Correlated metals as transparent conductors", Nature Materials, Dec. 2015, 18 pages.

Yusheng Bian et al., "Towards low-loss monolithic silicon and nitride photonic building blocks in state-of-the-art 300mm CMOS foundry", OSA frontiers in optics & laser science APS/DLS, FW5D. 2, Sep. 14-17, 2020, 2 pages.

Peng Xing et al., "Ultra-broadband and compact graphene-on-silicon integrated waveguide mode filters", Sientific Reports, Jun. 29, 2018, 9 pages.

Xiaoxi Wang et al., "Compact silicon photonic resonance-assisted variable optical attenuator", Optics Express, Nov. 28, 2016, vol. 24, No. 24, 14 pages.

Yue-Yang Yu et al., "The 650-nm variable optical attenuator based on polymer/silica hybrid waveguide", Chinese Physical Society and IOP Publishing Ltd, 2016, vol. 25, No. 5, 8 pages.

Yu Yu et al., "Silicon chip-scale space-division multiplexing: from devices to system", Science China Information Sciences, Aug. 2018, vol. 61, 19 pages.

F. P. Payne, "Control of Unwanted Light in Silicon Waveguide Circuits", IEEE, Dec. 2005, vol. 17, No. 12, 3 pages.

Daniel May-Arrioja et al., "Variable optical attenuator using active multimode interference waveguide", Proceedings of SPIE, Oct. 21, 2004, vol. 5622, 5 pages.

Specification and drawings in U.S. Appl. No. 16/919,867, filed Jul. 2, 2020, 30 pages.

Office Action in related U.S. Appl. No. 16/919,867 dated Nov. 30, 2021, 8 pages.

Response to Office Action in related U.S. Appl. No. 16/919,867, filed Feb. 28, 2022, 9 pages.

* cited by examiner

MULTI-MODE OPTICAL WAVEGUIDE STRUCTURES WITH ISOLATED ABSORBERS

FIELD OF THE INVENTION

The present disclosure relates to semiconductor structures and, more particularly, to multi-mode optical waveguide structures with isolated absorbers and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

Open or unconnected ports or other termination points of the photonics device can result in leakage or backscatter of the optical signal back into the chip. This can also cause crosstalk with other photonic devices, as well as overall interference of the optical signal. To prevent such issues from occurring, an absorber (e.g., absorber) is coupled to the open or unconnected ports or other termination points of the photonics device. The absorbers are known to be manufactured from Ge material as they are easily integrated into the fabrication processes of the photonics devices.

SUMMARY

In an aspect of the disclosure, a structure comprises: a waveguide structure comprising tapered segments; and at least one isolated waveguide absorber adjacent to the waveguide structure along its length.

In an aspect of the disclosure, a structure comprises: a waveguide structure comprising semiconductor material and having at least one tapered section along its length; and at least one waveguide absorber comprising a combination of semiconductor materials, the at least one waveguide absorber positioned along a length of the waveguide structure.

In an aspect of the disclosure, a method comprises: forming a waveguide structure comprising tapered segments; and forming at least one isolated waveguide absorber adjacent to the waveguide structure along its length.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to multi-mode optical waveguide structures with isolated absorbers and methods of manufacture. More specifically, the multi-mode optical waveguide structures comprise multi-stage-Si waveguide structures with a piecewise taper to selectively couple fundamental and higher-order modes to adjacent, isolated absorbers (e.g., attenuators) for light attenuation. In embodiments, the multi-mode optical waveguide structures and isolated absorbers provide passive attenuation by leveraging evanescent coupling between various Si photonic modes and Ge-on-Si modes to reduce back reflection. Also, advantageously, the structures described herein are capable of attenuating various types of optical modes (e.g., fundamental and higher-order modes), while keeping a compact footprint and without the need of introducing additional fabrication steps.

In embodiments, the multi-mode optical waveguide structures include a piecewise-tapered waveguide structure with one or more isolated waveguide segments, e.g., absorbers. The isolated segments may be positioned above and/or below the waveguide structure. In embodiments, the isolated segments can include a tapered input section (e.g., down to minimum feature size) to reduce the back reflection. In further embodiments, the isolated segments can be offset from the tapers of the waveguide structure. In addition, the isolated segments can include Ge material on Si, with the Ge material completely within a boundary of Si or other semiconductor material. A polysilicon or Ge region can be located at the end of the multi-mode optical waveguide structure, with the polysilicon region, for example, capable of coupling the transverse magnetic (TM) mode.

The multi-mode optical waveguide structures with isolated absorbers of the present disclosure can be manufactured in a number of ways using a number of different tools. In general, though, the methodologies and tools are used to form structures with dimensions in the micrometer and nanometer scale. The methodologies, i.e., technologies, employed to manufacture the multi-mode optical terminators of the present disclosure have been adopted from integrated circuit (IC) technology. For example, the structures are built on wafers and are realized in films of material patterned by photolithographic processes on the top of a wafer. In particular, the fabrication of the multi-mode optical waveguide structures with isolated absorbers uses three basic building blocks: (i) deposition of thin films of material on a substrate, (ii) applying a patterned mask on top of the films by photolithographic imaging, and (iii) etching the films selectively to the mask.

Figure 1:
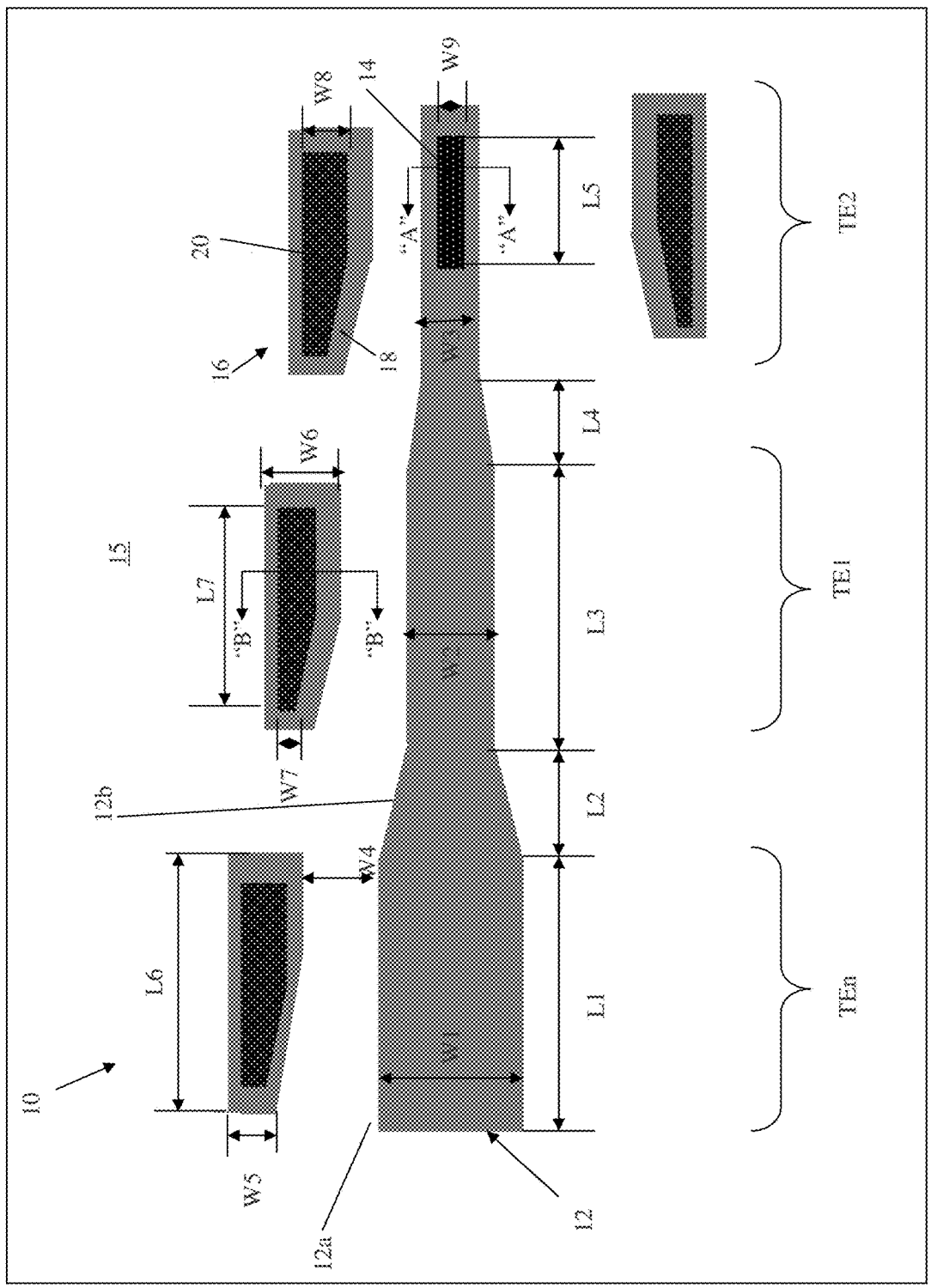
FIG. 1 shows a multi-mode optical waveguide structure with isolated absorbers, amongst other features, and respective fabrication processes in accordance with aspects of the present disclosure.

FIG. 1 shows a multi-mode optical waveguide structure with isolated absorbers, amongst other features, and respective fabrication processes. More specifically, the structure 10 shown in FIG. 1 includes a waveguide structure 12 composed of any suitable semiconductor material including, but not limited to, Si, SiN, SiCON, polymer, etc. In embodiments, the waveguide structure 12 can include single semiconducting material such as bulk silicon or, alternatively, semiconductor on insulator (SOI) technologies as is known in the art such that no further explanation is required for a complete understanding of the present disclosure. The waveguide structure 12 can be fabricated on an underlying insulator material 15, e.g., SiO2, or buried oxide layer in SOI technologies. As should be understood by those of ordinary skill in the art, in each of the embodiments, the insulator material 15 will also surround (clad) the waveguide structure 12 and isolated regions 16, e.g. absorbers, as further shown in FIGS. 2A-2E.

In any of the different scenarios, the waveguide structure 12 includes a plurality planar segments 12a for TE modes, e.g., TEn, TE1, TE2, etc., where TE is representative of a transverse electric coupling mode. The planar segments 12a (e.g., non-tapered segments) can be coupled together by tapered segments 12b. In this way, the waveguide structure 12 is a piecewise-tapered waveguide structure.

Figure 2A:
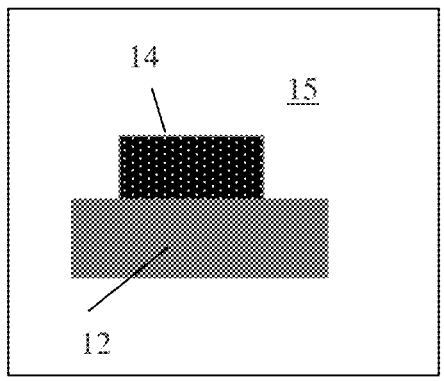
FIGS. 2A-2E show different configurations of the multi-mode optical waveguide structure and isolated absorbers, and respective fabrication processes in accordance with aspects of the present disclosure.
Figure 2D:
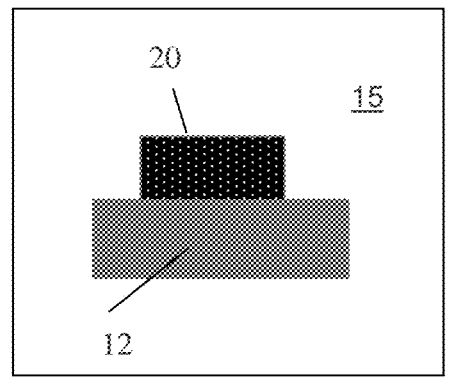
Figure 2B:
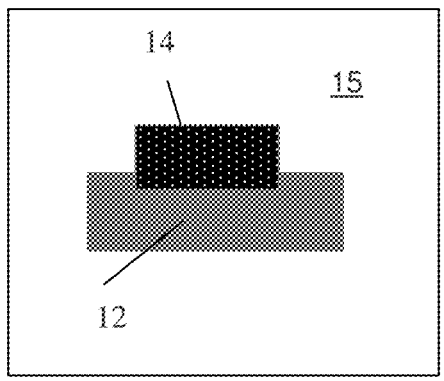
Figure 2E:
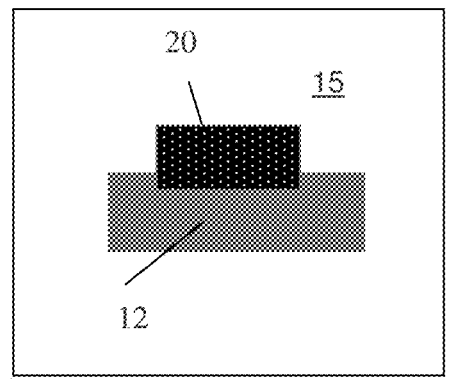
Figure 2C:
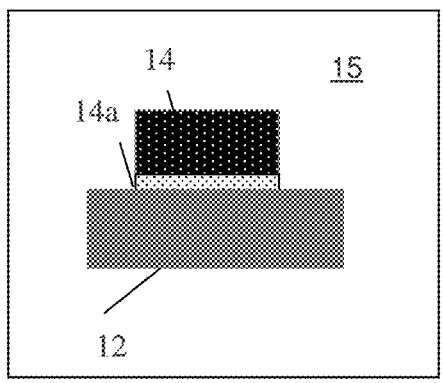

A polysilicon material 14 can be provided at the output end of the waveguide structure 12, lying completely within a boundary of the semiconductor, e.g., material of the waveguide structure 12. In embodiments, the polysilicon material 14 can be used for coupling the TM mode to Ge regions of isolated segments 16. The polysilicon material 14 can be a full height as shown in FIG. 2A, recessed into the waveguide structure 12 as shown in FIG. 2B or separated from the semiconductor material of the waveguide structure 12 by an intervening layer of oxide 14a as shown in FIG. 2C, for example, all of which are representative of a cross-sectional view along "A"-"A" of FIG. 1. In still further embodiments, the polysilicon material 14 can be replaced with Ge material, depending on the particular design parameters and desired functionality of the structure 10.

Still referring to FIG. 1, a plurality of isolated segments 16, e.g., absorbers, can be positioned adjacent to, but separated from, the waveguide structure 12 by a predetermined distance (e.g., distance "W4"). The isolated segments 16 can act as mode filters to selectively attenuate specific (single) or multiple modes. In any of the embodiments described herein, the isolated segments 16 can be located above and/or below the waveguide structure 12 along its length. Moreover, each of the isolated segments 16 can include a tapered input end 18 to reduce the back reflection. For example, the tapered input end 18 can be tapered to a minimum feature size to reduce the back reflection. The tapered input ends 18 can be aligned with or offset from the tapered segments 12b of the waveguide structure 12. For example, although not to be a limiting feature, the offset between the tapered segments 12b of the waveguide structure 12 and the isolated segments 16 can be within the range of 0.09 μm to 0.5 μm.

The plurality of isolated segments 16 can be composed of the same semiconductor material or different semiconductor material as the waveguide structure 12. For example, the isolated segments 16 and the waveguide structure 12 can be composed of Si material. Moreover, as another illustrative example, the waveguide structure 12 can be composed of SiN and the plurality of isolated segments 16 can be composed of Si, SiN, etc. at a different (higher) level as the waveguide structure 12.

As further shown in FIG. 1, the plurality of isolated segments 16 include a Ge material 20 within the boundaries of the plurality of isolated segments 16, e.g., the boundary of the Ge material 20 lies completely within a boundary of the isolated segments 16. The Ge material 20 can be a full height as shown in FIG. 2D or recessed into the isolated segments 16 as shown in FIG. 2E, each of which are representative of a cross-sectional view along line "B"-"B" of FIG. 1. As should be understood by those of skill in the art, the Ge material 20 efficiently and passively absorbs light. Also, as shown in FIGS. 2A-2E, the plurality of isolated segments 16 and the waveguide structure 12 are cladded with the insulator material 15, e.g., oxide.

In embodiments, the non-tapered segments 12a and the tapered segments 12b of waveguide structure 12, as well as the plurality of isolated segments 16 can be formed by conventional lithography and etching processes known to those of skill in the art. For example, a resist formed over semiconductor material is exposed to energy (light) to form a pattern (opening). An etching process with a selective chemistry, e.g., reactive ion etching (RIE), will be used to removed semiconductor material through the openings of the resist, resulting in the pattern of the non-tapered segments 12a, the tapered segments 12b and the isolated segments 16. In the embodiments shown in FIG. 2B or FIG. 2E, for example, the underlying semiconductor material can further undergo a thinning process. The resist can then be removed by a conventional oxygen ashing process or other known stripants.

The polysilicon material 14 (or alternatively, the Ge material) and Ge material 20 can be patterned in a similar manner, subsequent to being formed, e.g., deposited, on the semiconductor material of the waveguide structure 12 and the isolated segments 16. Prior to the deposition process, in embodiments of FIG. 2B or FIG. 2E, for example, the underlying semiconductor material can undergo an additional thinning step using, for example, a timed dry etching process. In embodiments, the polysilicon material 14 (or alternatively, the Ge material) and Ge material 20 can be formed by conventional deposition methods such as, e.g., chemical vapor deposition, etc., within the thinned portions or over non-thinned portions of the semiconductor material.

The dimensions of the waveguide structure 12 and isolated segments 16 can vary depending on the particular application, e.g., attenuation mode. Table 1, for example, shows illustrative, non-limiting examples of different dimensions of the patterned features of the waveguide structure 12 and isolated segments 16 as it relates to the different dimensional references shown in FIG. 1, including the tapered configurations 12b, 18.

TABLE 1

| Dimension | Range |
| --- | --- |
| W1 (width of the first section (TEn) of the waveguide structure 12) | 0.5 μm-5 μm |
| W2 (width of the second section (TE1) of the waveguide structure 12) | 0.4 μm-4 μm |
| W3 (width of the second section (TE2) of the waveguide structure 12) | 0.2 μm-0.4 μm |
| W4 (distance between the | 0.09 μm-0.5 μm |

TABLE 1-continued

| Dimension | Range |
| --- | --- |
| waveguide structure 12 and isolated segments 16) | |
| W5 (width of the tapered end of the isolated segments 16) | 0.09 μm-0.2 μm |
| W6 (width of the non-tapered end of the isolated segments 16) | 0.3 μm-2 μm |
| W7 (width of the tapered end of the Ge material 20 of the isolated segments 16) | 0.5 μm-1.5 μm |
| W8 (width of the non-tapered end of the Ge material 20 of the isolated segments 16) | 0.5 μm-1.8 μm |
| W9 (width of the polysilicon material 14) | 0.09 μm-0.36 μm |
| L1 (length of the first section (TEn) of the waveguide structure 12) | 5 μm-30 μm |
| L2 (length of the taper between the first and second sections of the waveguide structure 12) | 5 μm-30 μm |
| L3 (length of the second section (TE1) of the waveguide structure 12) | 5 μm-30 μm |
| L4 (length of the taper between the second and third sections of the waveguide structure 12) | 5 μm-30 μm |
| L5 (length of the polysilicon material 14 in the third section (TE2) of the waveguide structure 12) | 5 μm-30 μm |
| L6 (length of the isolated segments 16) | 5 μm-30 μm |
| L7 (length of the Ge material 20 of the isolated segments 16) | 6 μm-28 μm |

Figure 3:
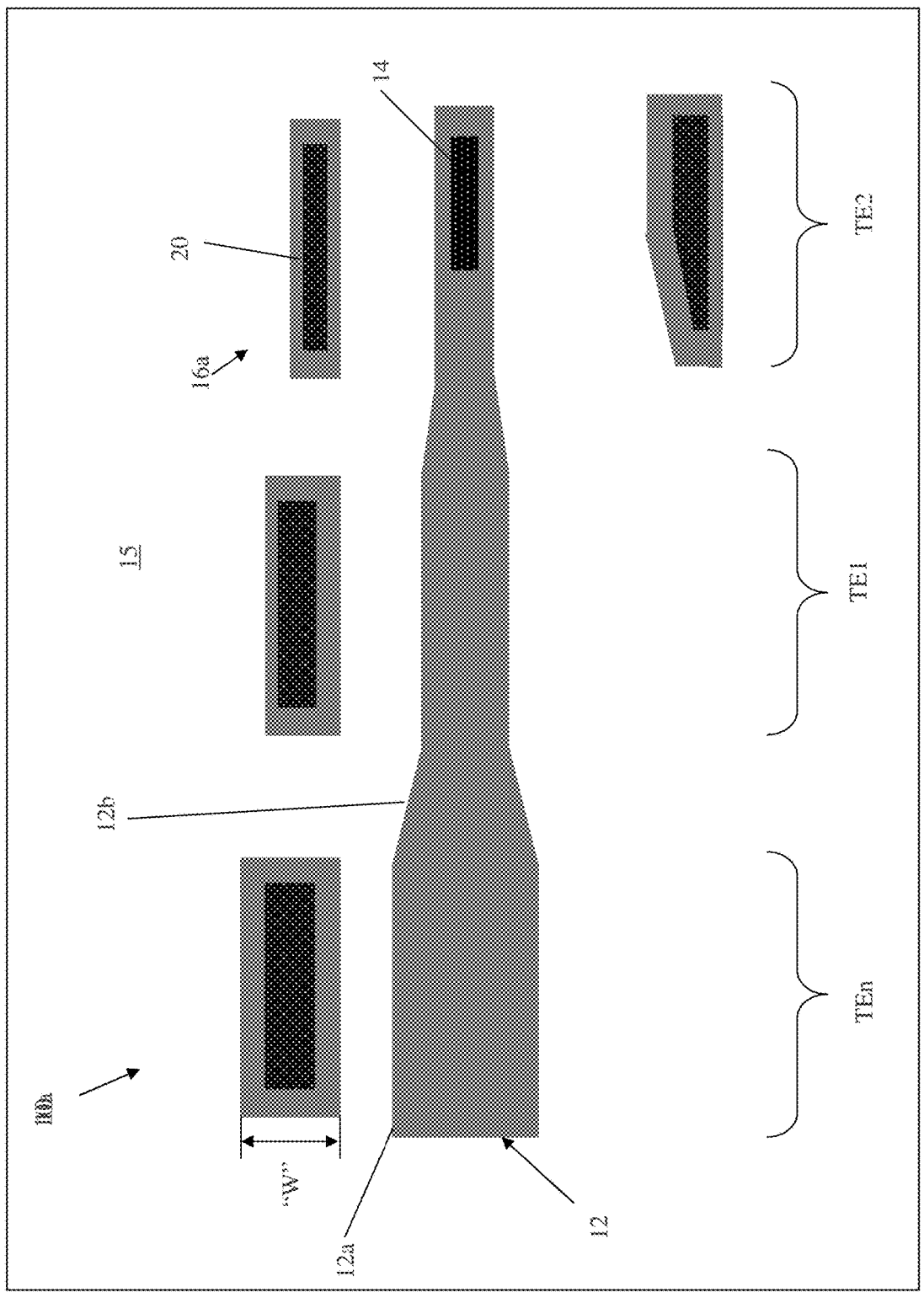
FIG. 3 shows a multi-mode optical waveguide structure with non-tapered isolated absorbers, amongst other features, and respective fabrication processes in accordance with aspects of the present disclosure.

FIG. 3 shows a multi-mode optical waveguide structure with non-tapered isolated absorbers, amongst other features. More specifically, the structure 10a shown in FIG. 3 includes a waveguide structure 12 with non-tapered isolated regions 16a. In addition, in embodiments, the widths "W" of each non-tapered isolated regions 16a can be narrower for each subsequent non-tapered isolated region, along the length of the waveguide structure 12. The remaining features of FIG. 3 can be similar to that described with respect to FIGS. 1-2E.

Figure 4:
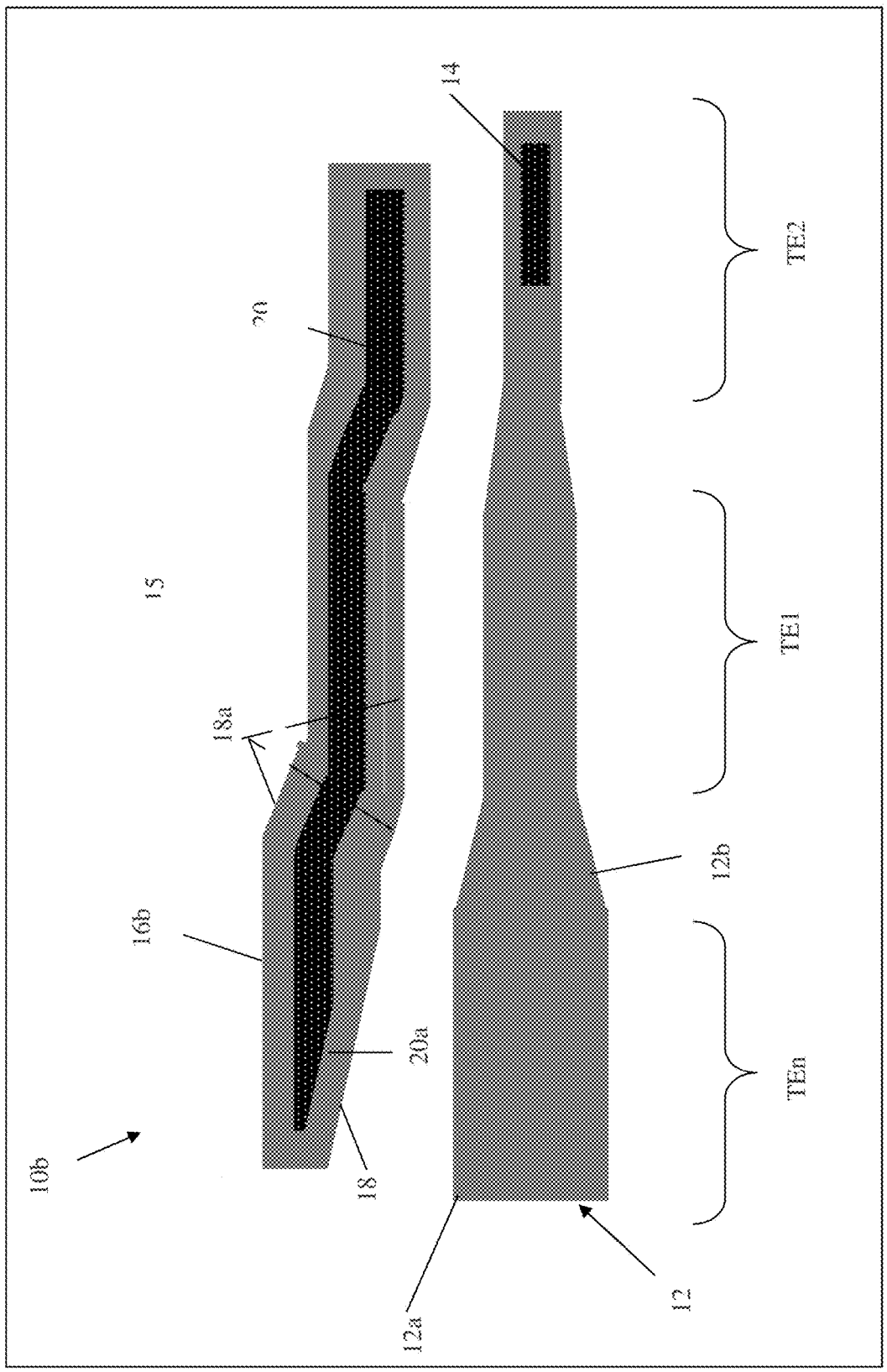
FIG. 4 shows a continuous isolated absorber along the length of the waveguide structure, amongst other features, and respective fabrication processes in accordance with aspects of the present disclosure.

FIG. 4 shows a continuous, isolated absorber 16b along the length of the waveguide structure 12. More specifically, the structure 10b shown in FIG. 4 includes a waveguide structure 12 with a continuous isolated region 16b comprising a taper 18 at its input end. The continuous isolated region 16b can be above and/or below the waveguide structure 12. In addition, in embodiments, the continuous isolated region 16b includes several contours (segments) 18a that follow and, in embodiments, are parallel to the non-tapered segments 12a and tapered segments 12b of the waveguide structure 12. In further embodiments, the continuous isolated region 16b includes material 20, e.g., Ge material, within the boundaries of the isolated region 16b. As in the previous embodiments, the Ge material 20 can be recessed within the semiconductor material of the isolated region 16b or be at a full height above the semiconductor material of the isolated region 16b. Also, the Ge material 20 can include a tapered input end 20a. The Ge material 20 can also include contours that follow and, in embodiments, are parallel to the non-tapered segments 12a and tapered segments 12b of the waveguide structure 12. The remaining features of FIG. 3 can be similar to that described with respect to FIGS. 1-3.

Figure 5:
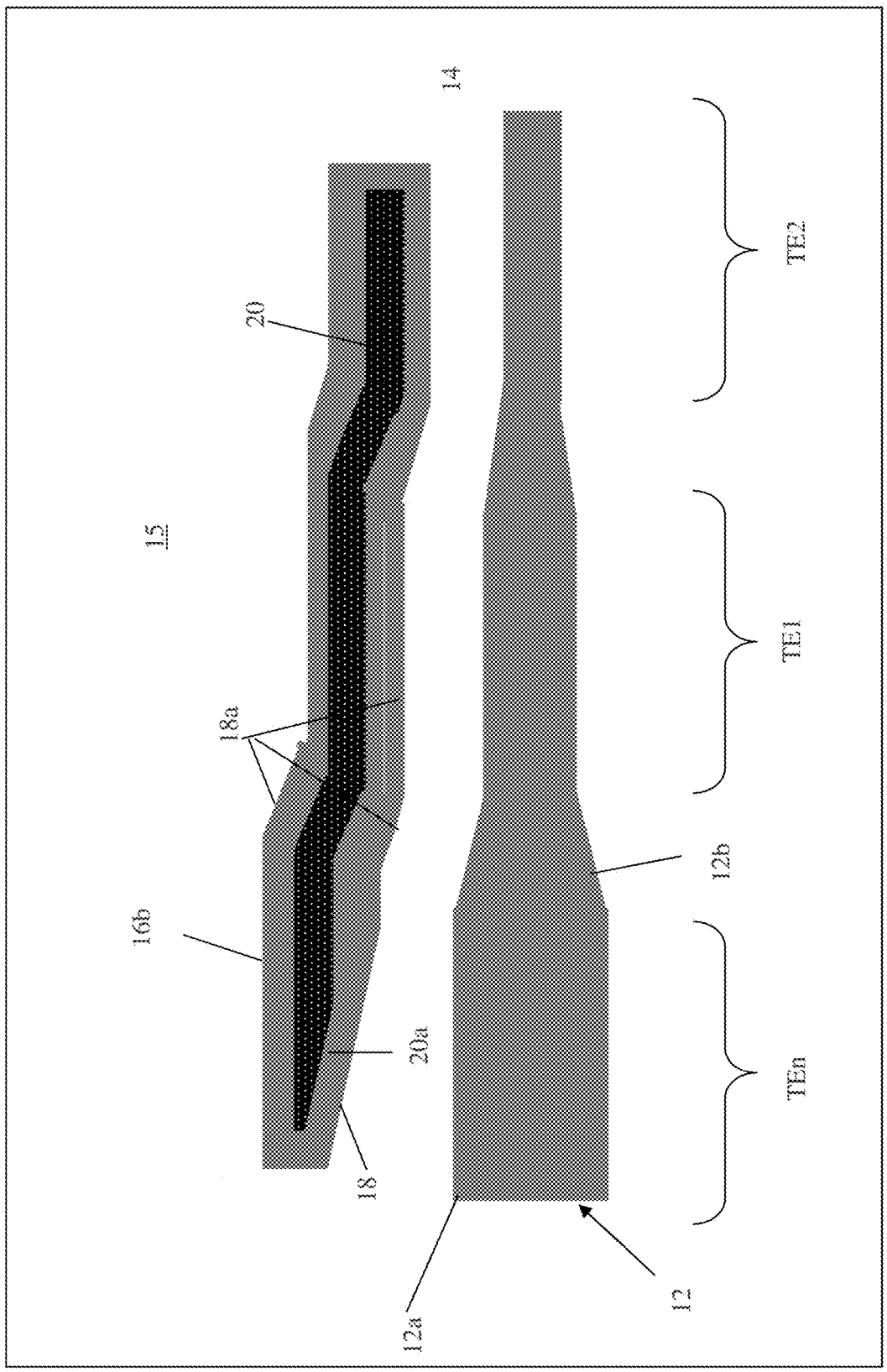
FIG. 5 shows a continuous isolated absorber along the length of the waveguide structure, amongst other features, and respective fabrication processes in accordance with additional aspects of the present disclosure.

In the embodiment of FIG. 5, the waveguide structure 12 comprises SiN material patterned at a different level than the continuous isolated absorber 16b. In this embodiment, the continuous isolated absorber 16b comprises a combination of Si material and Ge material 20 within the boundaries of the Si material. Also, the waveguide structure 12 does not include any polysilicon material at its output end. The remaining features of FIG. 3 can be similar to that described with respect to FIGS. 1-4.

Figure 6:
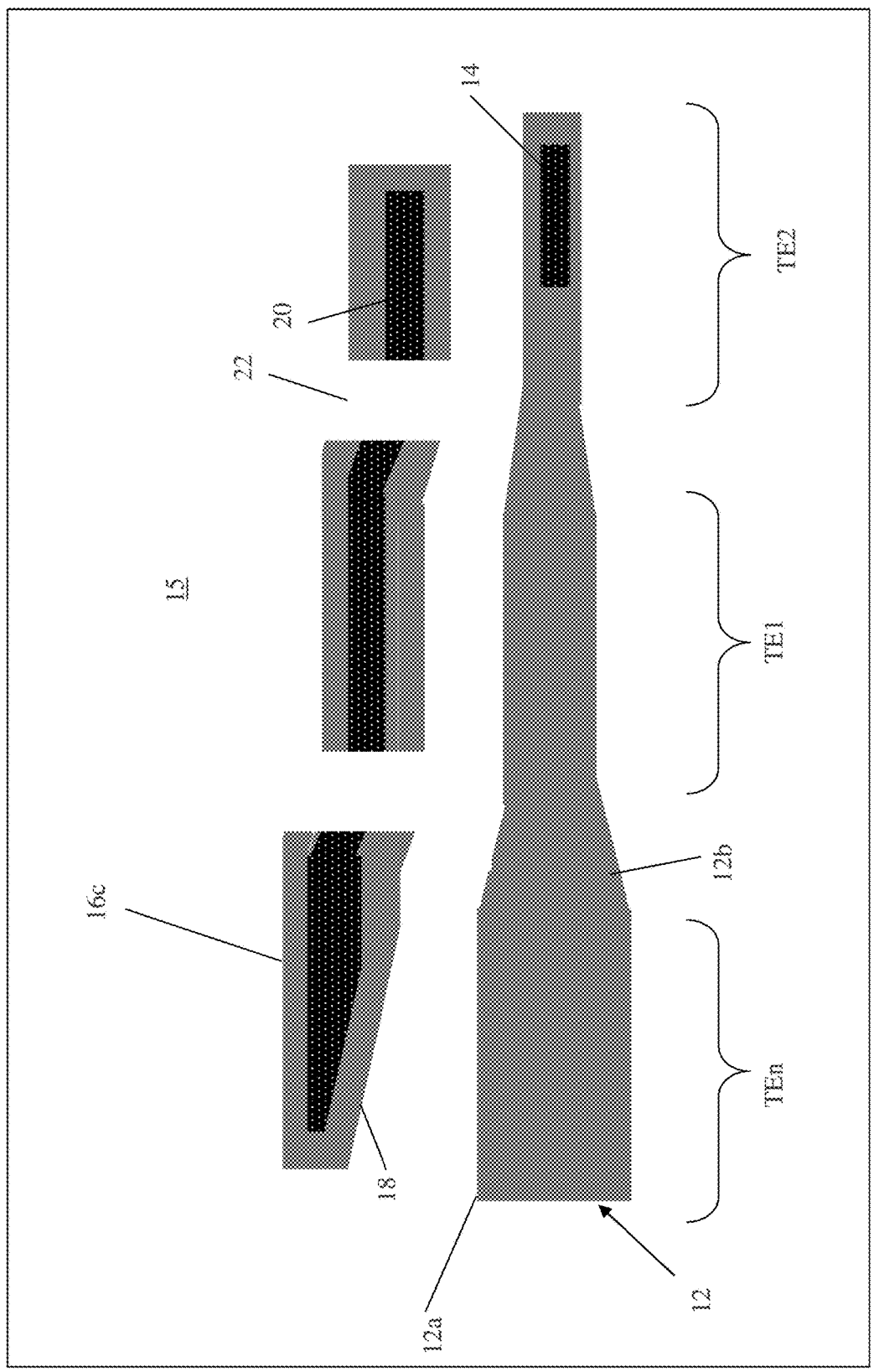
FIG. 6 shows the continuous isolated absorber with cuts along its length, amongst other features, and respective fabrication processes in accordance with aspects of the present disclosure.

FIG. 6 shows an alternative segmented isolated absorber 16c along the length of the waveguide structure 12. In this embodiment, the continuous isolated absorber 16b of either FIG. 4 or FIG. 5 can be cut, e.g., patterned, into various segments along the length of the waveguide structure 12. In preferred embodiments, the cut 22 coincide with the tapers 12b of the waveguide structure 12. The remaining features of FIG. 5 can be similar to that described with respect to FIG. 4 or FIG. 5.

The multi-mode optical waveguide structures with isolated absorbers can be utilized in system on chip (SoC) technology. It should be understood by those of skill in the art that SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also commonly used in embedded systems and the Internet of Things.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. A structure comprising:
    a waveguide structure comprising tapered segments comprising semiconductor material;
    at least one isolated waveguide absorber adjacent to the waveguide structure along its length; and a polysilicon material located at an output end of the waveguide structure, wherein boundaries of the polysilicon material are within boundaries of the semiconductor material of the waveguide structure.

2. The structure of claim 1, wherein the semiconductor material of the waveguide structure comprises recesses and the polysilicon material is within the recesses.

3. The structure of claim 1, wherein the waveguide structure comprises Si material and the least one isolated waveguide absorber comprises Si material and Ge material.

4. The structure of claim 3, wherein the Ge material is recessed into the Si material of the least one isolated waveguide absorber.

5. The structure of claim 1, further comprising an insulator material which separates the polysilicon material from semiconductor material of the waveguide structure.

6. The structure of claim 1, wherein the at least one isolated waveguide absorber comprises multiple waveguide absorbers along the length of the waveguide structure.

7. The structure of claim 6, wherein the multiple waveguide absorbers each comprise a tapered input end.

8. The structure of claim 7, wherein the tapered input end of each of the multiple waveguide absorbers is offset from the tapered segments of the waveguide structure.

9. The structure of claim 1, wherein the at least one isolated waveguide absorber comprises a single continuous waveguide absorber along the length of the waveguide structure, and the single continuous waveguide absorber comprises Si material and Ge material.

10. The structure of claim 1, wherein the waveguide structure comprises SiN material on a different level than the at least one isolated waveguide absorber.

11. The structure of claim 1, wherein the waveguide structure and the at least one isolated waveguide absorber are cladded in oxide.

12. The structure of claim 1, wherein the at least one isolated waveguide absorber comprises multiple waveguide absorbers positioned at least one of above and below the waveguide structure.

13. A structure comprising:
a waveguide structure comprising semiconductor material and having at least one tapered section along its length;
at least one waveguide absorber comprising a combination of semiconductor materials, the at least one waveguide absorber positioned along a length of the waveguide structure; and
a polysilicon material located at an output end and within boundaries of the semiconductor material of the waveguide structure.

14. The structure of claim 13, wherein the at least one waveguide absorber comprises multiple waveguide absorbers each of which include a tapered input end offset from the at least one tapered section of the waveguide structure.

15. The structure of claim 13, wherein the at least one waveguide absorber comprises a single continuous waveguide absorber that runs substantially parallel to contours of the waveguide structure.

16. The structure of claim 15, wherein the single continuous waveguide absorber includes a tapered input end and comprises two different semiconductor materials.

17. The structure of claim 13, wherein the waveguide structure comprises SiN material and the at least one waveguide absorber comprises Si material and Ge material, and the waveguide structure is on a different level than the at least one waveguide absorber.

18. The structure of claim 13, wherein the semiconductor material of the waveguide structure comprises recesses and the polysilicon material is within the recesses.

19. A method comprising:
forming a waveguide structure comprising tapered segments; and
forming at least one isolated waveguide absorber adjacent to the waveguide structure along its length; and
forming a polysilicon material located at an output end of the waveguide structure, wherein boundaries of the polysilicon material are within boundaries of the waveguide structure.

20. The method of claim 19, wherein the waveguide structure comprises semiconductor material of the waveguide structure and further comprising forming a recess within the semiconductor material of the waveguide structure and placing the polysilicon material within the recesses.

* * * * *